(12) United States Patent
Hsieh

(10) Patent No.: US 11,469,793 B2
(45) Date of Patent: Oct. 11, 2022

(54) WIRELESS ACCESS POINT DEVICE

(71) Applicant: ACCTON TECHNOLOGY CORPORATION, Hsinchu (TW)

(72) Inventor: Chih-Chang Hsieh, Hsinchu (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 162 days.

(21) Appl. No.: 17/148,516

(22) Filed: Jan. 13, 2021

(65) Prior Publication Data
US 2021/0226665 A1 Jul. 22, 2021

(30) Foreign Application Priority Data
Jan. 21, 2020 (TW) ................. 109200950

(51) Int. Cl.
| | |
|---|---|
| H01Q 1/08 | (2006.01) |
| H04B 3/52 | (2006.01) |
| H04B 3/56 | (2006.01) |
| H04W 84/12 | (2009.01) |
| H01Q 13/24 | (2006.01) |
| H01Q 13/02 | (2006.01) |
| H01Q 1/22 | (2006.01) |
| H01Q 19/19 | (2006.01) |

(52) U.S. Cl.
CPC ............. *H04B 3/52* (2013.01); *H01Q 1/088* (2013.01); *H01Q 1/2291* (2013.01); *H01Q 13/02* (2013.01); *H01Q 13/24* (2013.01); *H01Q 19/193* (2013.01); *H04B 3/56* (2013.01); *H04W 84/12* (2013.01)

(58) Field of Classification Search
CPC .... H01Q 1/088; H01Q 1/2291; H01Q 19/193; H04W 88/08
See application file for complete search history.

(56) References Cited

U.S. PATENT DOCUMENTS

| | | | |
|---|---|---|---|
| 9,742,069 B1* | 8/2017 | Hollenbeck | H01Q 13/0208 |
| 10,826,165 B1* | 11/2020 | Deju | H05K 5/069 |
| 2002/0105475 A1* | 8/2002 | Overton | H01Q 1/125 |
| | | | 343/878 |
| 2021/0226665 A1* | 7/2021 | Hsieh | H01Q 1/2291 |

* cited by examiner

*Primary Examiner* — Daniel Munoz
(74) *Attorney, Agent, or Firm* — CKC & Partners Co., LLC

(57) ABSTRACT

A wireless access point device includes a main frame, an antenna module, a signal transceiving element, an unlocking assembly and a fastener. The main frame includes a casing and a first connection portion formed with a fastening recess, connected to the casing and communicates with the internal space. The signal transceiving element is located in the casing. The antenna module includes a waveguide and a second connection portion disposed on one end of the waveguide. The second connection portion is detachably connected to the first connection portion to couple to the signal transceiving element. The unlocking assembly is movably located in the fastening recess. The fastener includes a buckle, and an elastic member that is connected to the second connection portion and the buckle. The antenna module is fixed on the main frame when the buckle is inserted into the fastening recess.

20 Claims, 7 Drawing Sheets

WIRELESS ACCESS POINT DEVICE

CROSS-REFERENCE TO RELATED APPLICATION

This application claims priority to Taiwan Application Serial Number 109200950, filed on Jan. 21, 2020, which is herein incorporated by reference.

BACKGROUND

Technical Field

The present disclosure relates to a wireless access point device. More particularly, the present disclosure relates to a wireless access point device capable of quickly releasing antenna module.

Description of Related Art

In recent years, Millimeter-wave (mmWave) technology of wireless transmission communication (e.g., 5th generation communication) has been developed aggressively, and researches on antenna modules for relevant wireless access points have been encouraged. Generally, an antenna module is usually installed on a higher place (e.g., eave or ceiling) or in a narrow position and fixed with a screwing fashion.

However, when disassembling, installing or replacing an antenna module from/to wireless access point, an operator needs to work with a screwdriver or a wrench.

Therefore, the conventional way may lead a complicated operation and slow progress in assembly/disassembly. In further, it would increase the risk that the worker or tool may fall from higher place.

SUMMARY

One aspect of the present disclosure is to provide a wireless access point device to solve the aforementioned problems of the prior art.

In one embodiment of the disclosure, the wireless access point device includes a main frame, an antenna module, a transmission assembly, an unlocking assembly and a fastener. The main frame includes a casing and a first connection portion. The casing is formed with an internal space. The first connection portion is connected to the casing and communicates with the internal space, and the first connection portion is formed with a fastening recess. The transmission assembly is disposed in the internal space and provided with a signal transceiving element. The antenna module includes a waveguide and a second connection portion. The second connection portion is disposed on one end of the waveguide and detachably connected to the first connection portion to be couple to the signal transceiving element. The unlocking assembly is movably disposed in the fastening recess. The fastener includes a buckle and an elastic member respectively connected to the buckle and the second connection portion of the waveguide. Thus, the antenna module is fixed on the main frame when the buckle is inserted into the fastening recess. The second connection portion is separable from the first connection portion when the buckle is pushed out of the fastening recess by the unlocking assembly.

According to one or more embodiments of the disclosure, in the foregoing wireless access point device, the first connection portion includes a slot. The slot is communicated with the internal space and the fastening recess, and configured to accommodate the second connection portion. A longitudinal direction of the slot intersects a longitudinal direction of the fastening recess.

According to one or more embodiments of the disclosure, in the foregoing wireless access point device, the first connection portion includes a post. The post is protrudingly formed on an outer surface of the casing. The slot is formed on one end of the post facing away from the casing in which the longitudinal direction of the slot is parallel to a longitudinal direction of the post.

According to one or more embodiments of the disclosure, in the foregoing wireless access point device, the fastening recess includes an indentation hole and a through hole. The indentation hole is formed at one side of the post. The through hole is formed on one bottom portion of the indentation hole and configured for receiving the buckle. The indentation hole is communicated with the slot through the through hole. When the unlocking assembly pushes the buckle out of the fastening recess via the through hole, the second connection portion is separable from the first connection portion.

According to one or more embodiments of the disclosure, in the foregoing wireless access point device, the unlocking assembly includes a fixed base and a movable pin. The fixed base includes a base body and a through passage. The through passage penetrates through the base body to connect to the slot. The movable pin is reciprocally located in the through passage for pushing the buckle out of the fastening recess. The movable pin is restricted to be movable in the fastening recess by the base body.

According to one or more embodiments of the disclosure, in the foregoing wireless access point device, the fixed base includes a barrier portion. The barrier portion is protrudingly formed in the through passage and located opposite to the bottom portion of the indentation hole. The movable pin includes a shaft and a flange portion. The shaft is reciprocally located in the through passage. The flange portion is fixedly disposed on the shaft and restricted to be movable between the barrier portion and the bottom portion of the indentation hole.

According to one or more embodiments of the disclosure, in the foregoing wireless access point device, the second connection portion includes a tubular body and a groove. The tubular body includes a hollow channel, an inner surface and an outer surface. The hollow channel is coaxially located in the tubular body and the inner surface and the outer surface are opposed to each other and located in the hollow channel. The groove is formed on the outer surface of the tubular body. When the second connection portion inserts into the slot, the groove is located within the slot.

According to one or more embodiments of the disclosure, in the foregoing wireless access point device, the elastic member is disposed within the groove. The elastic member is provided with a free end and a fixed end fixedly connected to the tubular body of the second connection portion, and the buckle is fixedly disposed on the free end of the elastic member. When the second connection portion inserts into the slot, the buckle is oriented to moving into the fastening recess.

According to one or more embodiments of the disclosure, in the foregoing wireless access point device, the first connection portion is provided with a first positioning portion, and the second connection portion is provided with a second positioning portion. When the second positioning portion is engaged with the first positioning portion, the buckle is able to insert into the fastening recess.

According to one or more embodiments of the disclosure, in the foregoing wireless access point device, the antenna module includes an installation seat and a dish-shaped reflecting unit. The installation seat is formed on the waveguide. The dish-shaped reflecting unit includes a dish body and a parabolic concave surface. The dish body is fixedly disposed on the installation seat and surrounds the waveguide. The parabolic concave surface is formed on one surface of the dish body facing away from the casing.

According to one or more embodiments of the disclosure, in the foregoing wireless access point device, the transmission assembly further includes a reflective cover disposed within the internal space and fixedly arranged on the signal transceiving element.

In Another one embodiment of the disclosure, the wireless access point device includes a main frame, an antenna module, a transmission assembly, an unlocking assembly, an elastic member and a buckle. The main frame includes a casing having an internal space, a fastening recess, and a slot that is communicated with the internal space and the fastening recess. The transmission assembly is disposed in the internal space and provided with a signal transceiving element. The antenna module includes a waveguide in which one end of the waveguide is detachably located in the slot to be coupled to the signal transceiving element. The unlocking assembly is movably disposed on one end of the fastening recess. The elastic member includes a free end and a fixed end in which the fixed end is opposite to the free end and fixedly connected to the end of the waveguide. The buckle is disposed on the free end of the elastic member. Thus, when the elastic member is located within the slot, the buckle is moved into the fastening recess for fixing the antenna module on the main frame.

In still another embodiment of the disclosure, the wireless access point device includes a main frame, a signal transceiving element, a reflective cover, an antenna module, an unlocking assembly and a fastener. The main frame includes a front cover, a rear cover, a post, a fastening recess and a slot. The front cover is formed with an opening, an outer surface and an inner surface, and the opening penetrates through the outer surface and the inner surface. The rear cover is assembled to the front cover to collectively define an internal space therebetween. The post is protrudingly formed on an outer surface of the casing. The fastening recess has a longitudinal direction. The slot is disposed on the post, connected to the internal space through the opening, and a longitudinal direction of the slot intersects the longitudinal direction of the fastening recess. The signal transceiving element is disposed within the internal space. The reflective cover is disposed within the internal space and fixed on the signal transceiving element. The antenna module includes a waveguide. One end of the waveguide is detachably located in the slot to be coupled to the signal transceiving element. The unlocking assembly movably disposed on the fastening recess. The fastener includes a buckle and an elastic member. When one end of the elastic member is connected to the waveguide, and the other end of the elastic member is fixed on the buckle, the buckle inserts into the fastening recess for fixing the antenna module on the main frame.

Thus, based on the embodiments above, the present disclosure not only facilitate time saving of maintaining or replacing antenna module for wireless access point device, but also reduce the risk fell from higher place and inconvenience of the maintaining or the replacing.

The above description is merely used for illustrating the problems to be resolved, the technical methods for resolving the problems and their efficacies, etc. The specific details of the present disclosure will be explained in the embodiments below and related drawings.

BRIEF DESCRIPTION OF THE DRAWINGS

The accompanying drawings are included to provide a further understanding of the present disclosure, and are incorporated in and constitute a part of this specification. The drawings illustrate embodiments of the disclosure and, together with the description, serve to explain the principles of the disclosure. In the drawings.

DETAILED DESCRIPTION

Figure 1:
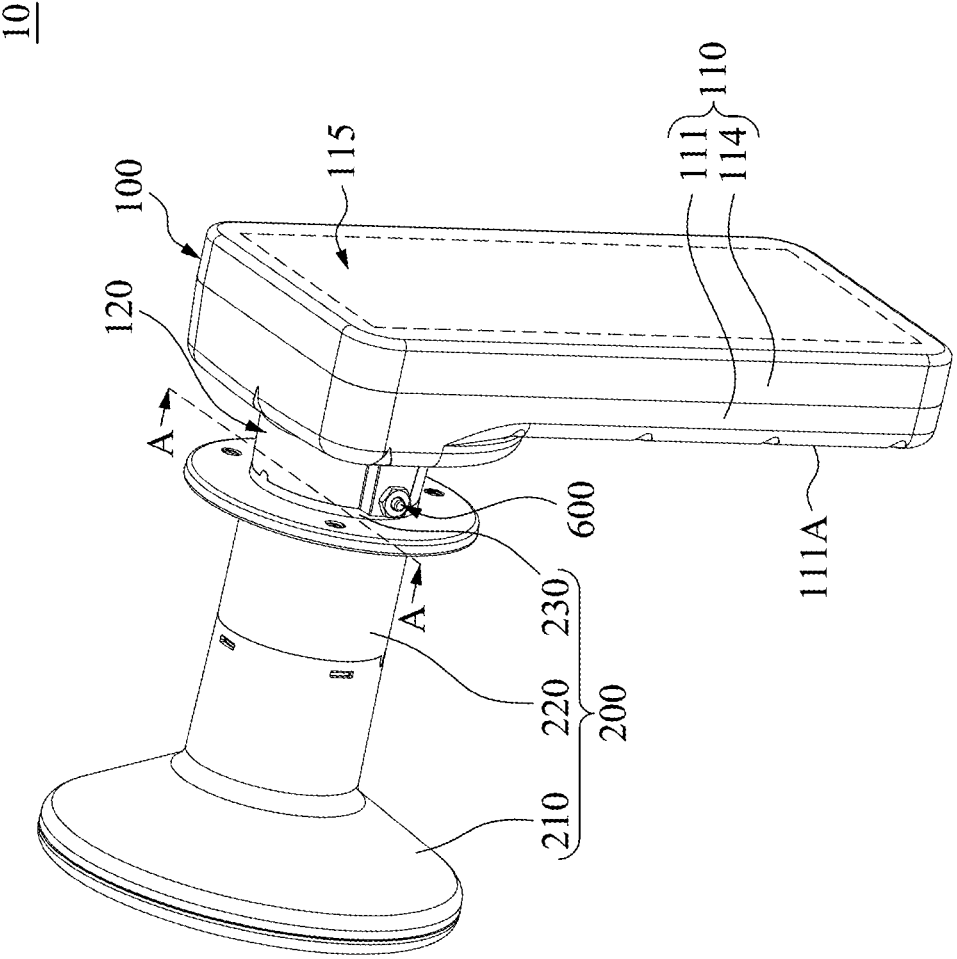
FIG. 1 is a perspective schematic view of a wireless access point device according to one embodiment of present disclosure.

Reference will now be made in detail to the present embodiments of the present disclosure, examples of which are illustrated in the accompanying drawings. Wherever possible, the same reference numbers are used in the drawings and the description to refer to the same or like parts. According to the embodiments, it will be apparent to those skilled in the art that various modifications and variations can be made to the structure of the disclosure without departing from the scope or spirit of the disclosure.

Figure 2:
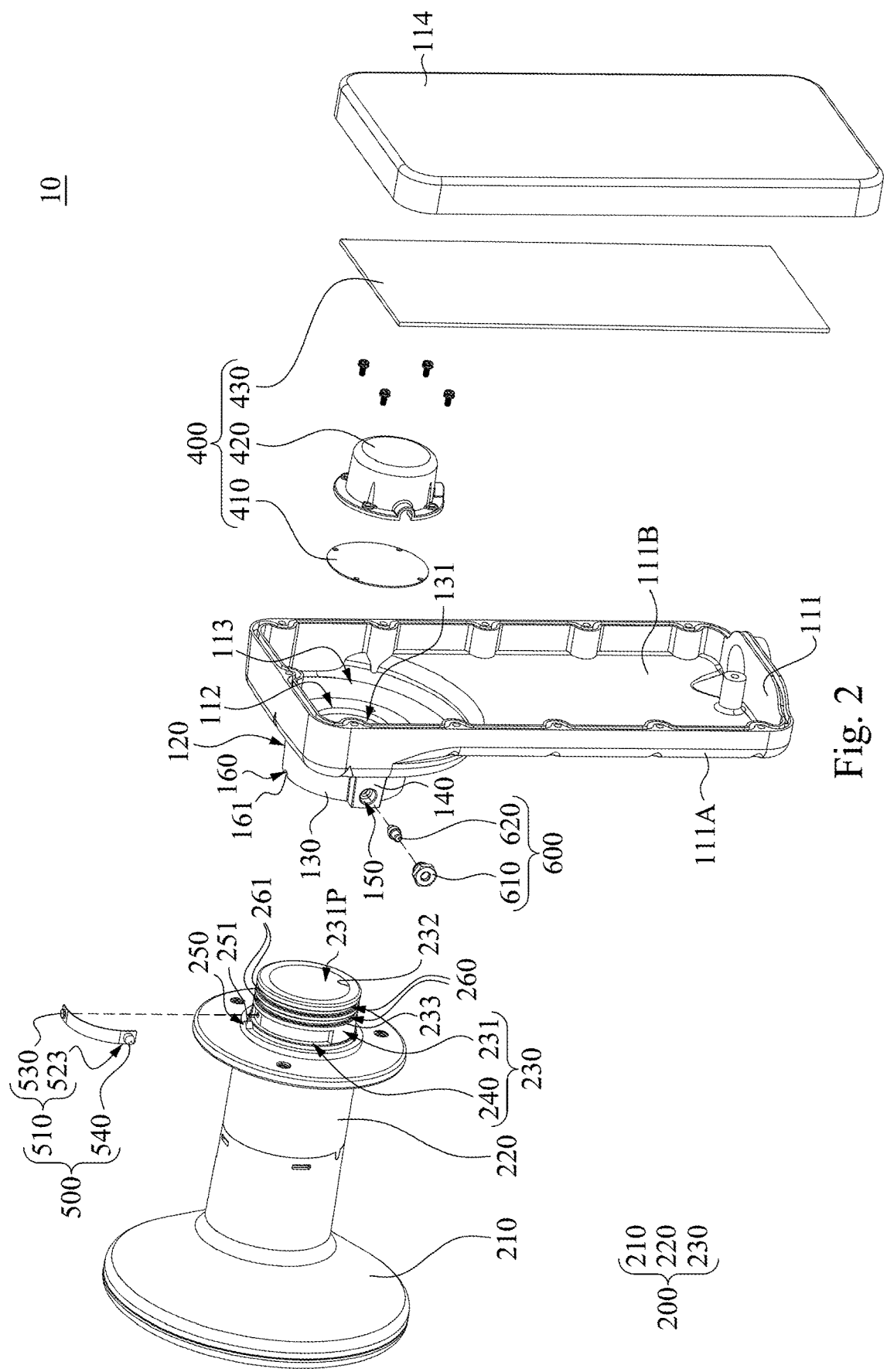
FIG. 2 is a detailed exploded view of the wireless access point device of FIG. 1.
Figure 3A:
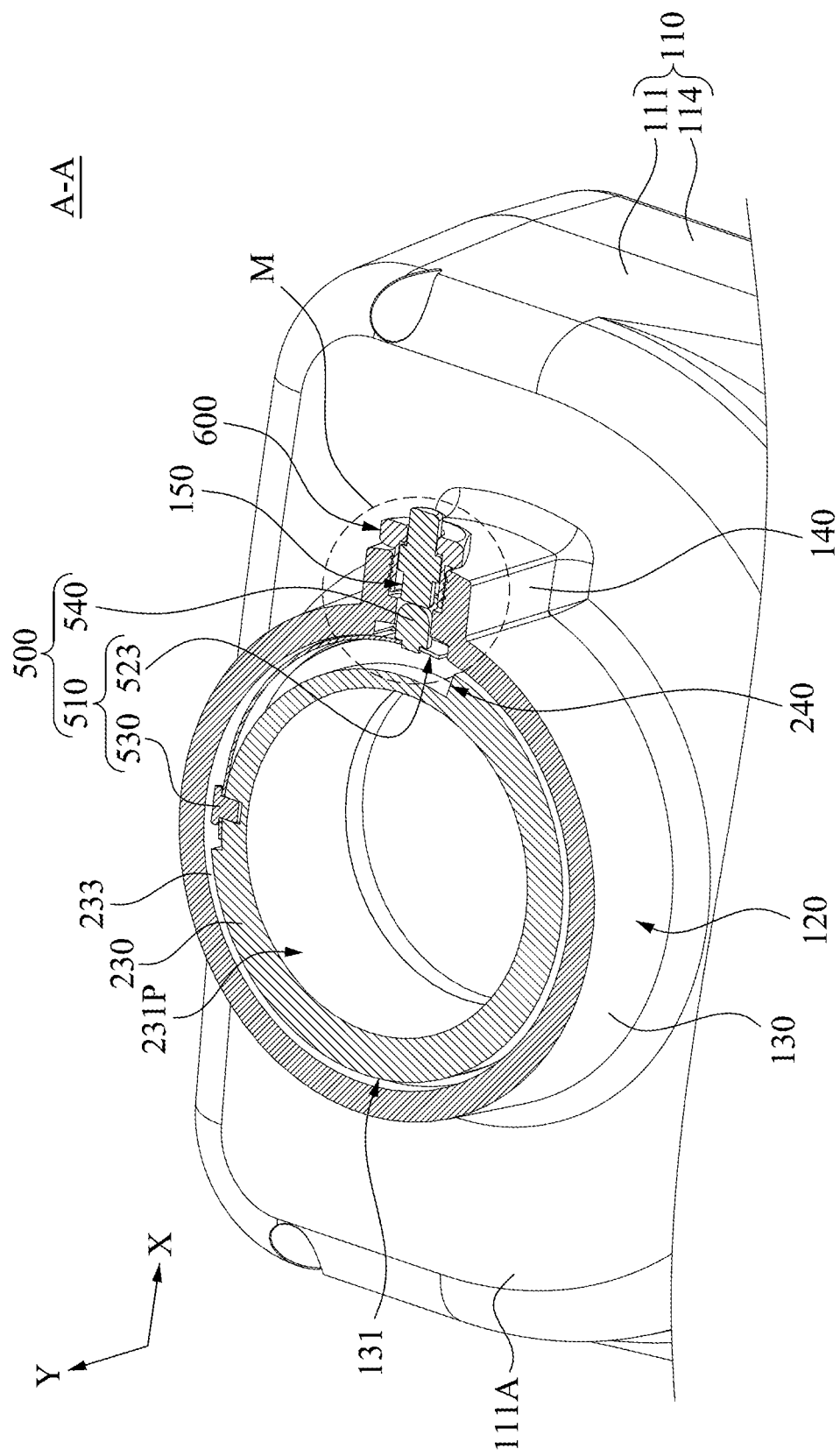
FIG. 3A is a partial cross-sectional view of the wireless access point device of FIG. 1 viewed along a line A-A.

FIG. 1 is a perspective schematic view of a wireless access point device 10 according to one embodiment of present disclosure. FIG. 2 is a detailed exploded view of the wireless access point device 10 of FIG. 1. FIG. 3A is a partial cross-sectional view of the wireless access point device 10 of FIG. 1 viewed along a line A-A. As shown in FIG. 1 and FIG. 2, in one embodiment, the wireless access point device 10 includes a main frame 100, an antenna module 200, a transmission assembly 400, a fastener 500 and an unlocking assembly 600. The main frame 100 includes a casing 110 and a first connection portion 120. The casing 110 is formed with an opening 112 and an internal space 115. The internal space 115 is located inside the casing 110. The opening 112 is formed on an outer surface of the casing 110 and in communication with the internal space 115. The first connection portion 120 is connected to the casing 110, is connected to the internal space 115 through the opening 112 of the casing 110. In the present embodiment, the first connection portion 120 includes a slot 131 that is in communication with the internal space 115 through the opening 112 of the casing 110, however, the present disclosure is not limited thereto. The first connection portion 120 is formed with a fastening recess 150. The transmission assembly 400 is disposed within the internal space 115 of the casing 110. The unlocking assembly 600 is disposed on the first connection portion 120 and movably disposed at one end of the fastening recess 150 (FIG. 3A).

The antenna module 200 includes a sub-reflector 210, a waveguide 220 and a second connection portion 230. The waveguide 220 is disposed between the sub-reflector 210 and the main frame 100. One end of the waveguide 220 is connected to the sub-reflector 210, and the second connection portion 230 is disposed on one end of the waveguide 220 facing away from the sub-reflector 210. The second connection portion 230 is detachably connected to the first connection portion 120 and coupled to the transmission assembly 400 so as to transmit and receive signals from the transmission assembly 400. The fastener 500 includes an elastic member 510 and a buckle 540. The elastic member 510 is connected to the buckle 540 and the second connection portion 230, respectively. Since the buckle 540 is moved with the elastic member 510, the buckle 540 is movable inside the fastening recess 150 (FIG. 3A).

Furthermore, the antenna module 200 includes an installation seat 270. The installation seat 270 is formed on the waveguide 220 so that an object (e.g., dish-shaped reflecting unit) can be subsequently mounted thereon. In the present embodiment, for example, the installation seat 270 is formed surrounding the waveguide 220 and is disposed between the sub-reflector 210 and the second connection portion 230.

Thus, as shown in FIG. 1 and FIG. 3A, when the second connection portion 230 is connected to the first connection portion 120 and the buckle 540 of the fastener 500 inserts into the other end of the fastening recess 150, the antenna module 200 is fixed on the casing 110 so as to assemble the antenna module 200 on the main frame 100. Thus, the second connection portion 230 of the waveguide 220 is able to couple to the transmission assembly 400. On the contrary, when the buckle 540 is pushed out of the other end of the fastening recess 150 by the unlocking assembly 600, the second connection portion 230 of the waveguide 220 can be separable from the first connection portion 120 of the main frame 100 when the buckle 540 is not located in the fastening recess 150. Thus, the antenna module 200 can be separated from the main frame 100.

More specifically, as shown in FIG. 2 and FIG. 3A, the casing 110 includes a front cover 111 and a rear cover 114. When the front cover 111 and the rear cover 114 are assembled together, the aforementioned internal space 115 (FIG. 1) is formed between the front cover 111 and the rear cover 114. The front cover 111 includes an outer surface 111A and an inner surface 111B, which are opposite to each other. The first connection portion 120 is located at the outer surface 111A of the front cover 111. The inner surface 111B of the front cover 111 is formed with a sunken area 113 in which the aforementioned opening 112 of the casing 110 is arranged in the sunken area 113 which accommodates or locates the transmission assembly 400.

More specifically, the transmission assembly 400 further includes a signal transceiving element 410, a reflective cover 420 and a processing circuit 430. The signal transceiving element 410 is disposed in the internal space 115 and aligns to the slot 131 of the first connection portion 120 via the opening 112 for coupling to the waveguide 220 to transmit and receive signals by the waveguide 220. The reflective cover 420 is disposed on the inner surface 111B of the front cover 111 to cover the sunken area 113 and the signal transceiving element 410. The reflective cover 420 and the signal transceiving element 410 are secured on the casing 110, collectively. The reflective cover 420 is used to reflect the electromagnetic wave excited by the signal transceiving element 410 into the waveguide 220. The processing circuit 430 is located between the reflective cover 420 and the rear cover 114. The processing circuit 430 is electrically connected to the signal transceiving element 410. The processing circuit 430 is used to process data to be transmitted or received, and then the data is transmitted or received by the antenna module 200 through electromagnetic waves.

As shown in FIG. 2 and FIG. 3A, in the present embodiment, the first connection portion 120 further includes a post 130. The post 130 is formed in a tubular shape and protrudingly formed on one surface of the casing 110. In the present embodiment, the post 130 protrudes from the outer surface 111A of the front cover 111 of the casing 110. The slot 131 is formed on one end surface of the post 130 facing away from the casing 110 and the slot 131 is in communication with the internal space 115 through the opening 112 of the casing 110 so that the second connection portion 230 is able to insert into the slot 131. In the present embodiment, the post 130 is further formed with a protrusion portion 140 that is protrudingly formed on an outer surface of the post 130. The fastening recess 150 runs through the protrusion portion 140 and the fastening recess 150 is in communication with the slot 131. For example, the longitudinal direction (e.g., the direction Y) of the slot 131 is parallel to the longitudinal direction (e.g., the direction Y) of the post 130, and the longitudinal direction (e.g., the direction X) of the fastening recess 150 intersects the longitudinal direction of the slot 131 (e.g., the direction Y), but not limited thereto.

Figure 3B:
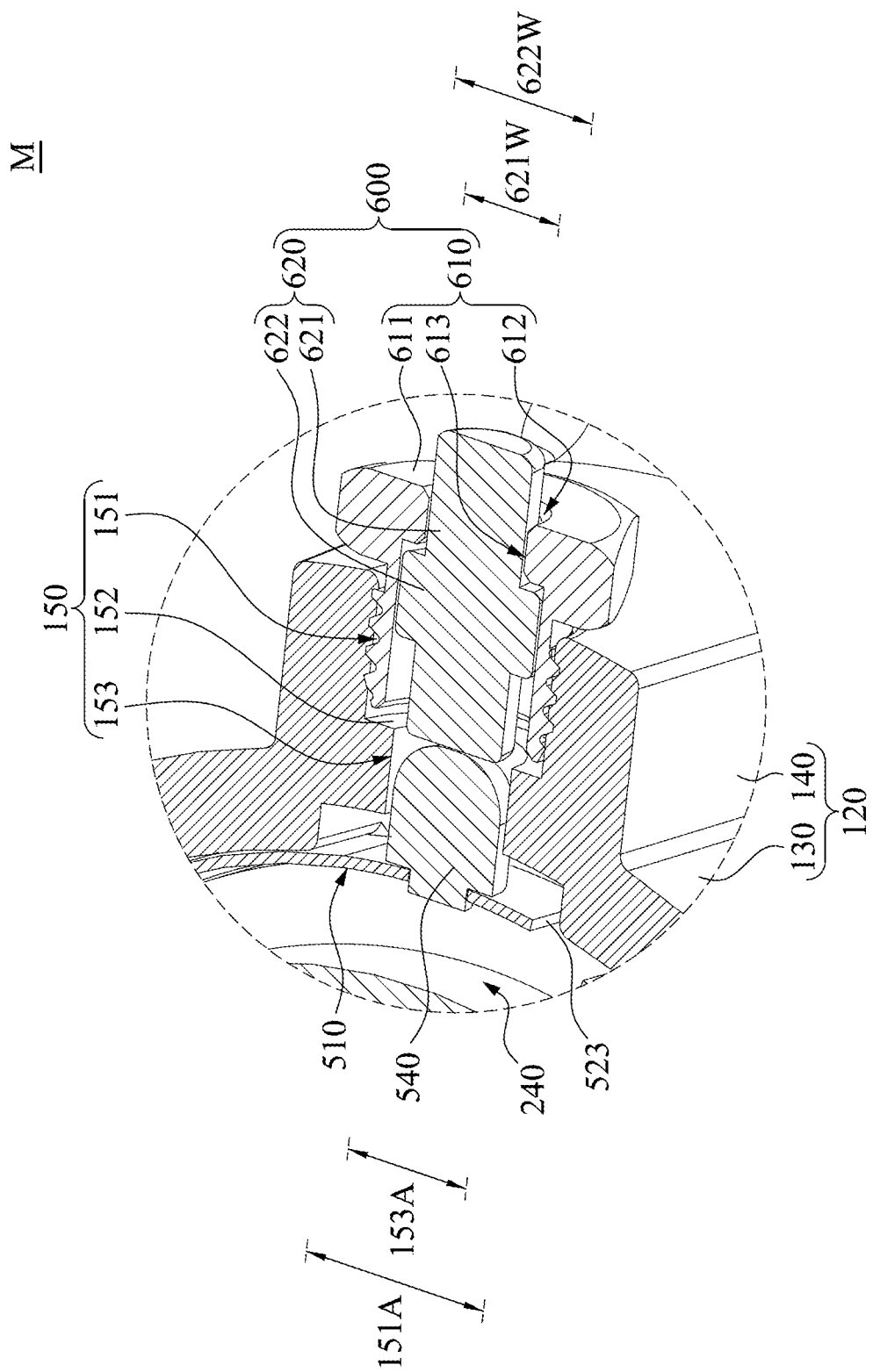
FIG. 3B is a partial enlarging view of an area M of FIG. 3A.

FIG. 3B is a partial enlarging view of an area M of FIG. 3A. As shown FIG. 2 and FIG. 3B, in details, the fastening recess 150 includes an indentation hole 151 and a through hole 153. The indentation hole 151 is formed on one end surface of the protrusion portion 140 facing away from the post 130. The through hole 153 is formed on one bottom portion 152 of the indentation hole 151 to communicate with the indentation hole 151 and the slot 131, respectively. On the other words, the indentation hole 151 is communicated with the slot 131 through the through hole 153. In the present embodiment, a hole diameter 151A of the indentation hole 151 is greater than a hole diameter 153A of the through hole 153, but not limited thereto. In other words, the indentation hole 151 is formed at the outer end of the fastening recess 150, and the through hole 153 is formed at the inner end of the fastening recess 150.

In the present embodiment, as shown in FIG. 2 and FIG. 3B, the second connection portion 230 includes a tubular body 231 and a groove 240. The tubular body 231 includes a hollow channel 231P coaxially located in the tubular body 231, an inner surface 232 located in the hollow channel 231P, and an outer surface 233 which is opposed to the inner surface 232. The hollow channel 231P is formed on an end surface of the tubular body 231 facing away from the waveguide 220, that is, an end surface of the tubular body 231 facing towards the signal transceiving element 410. Exemplarily, the groove 240 is curved, and formed on the outer surface 233 of the tubular body 231. Thus, when the second connection portion 230 of the waveguide 220 inserts into the slot 131 of the first connection portion 120, the groove 240 is located within the slot 131 (FIG. 3A).

The elastic member 510 is provided with a fixed end 530 and a free end 523. The buckle 540 is disposed on the free end 523 of the elastic member 510. In the present embodiment, the groove 240 is curved, and the fixed end 530 and the free end 523 are arranged oppositely on the elastic member 510. The radian of the elastic member 510 that is arranged within the groove 240 can be set to match the radian of the groove 240. The fixed end 530 of the elastic member 510 is fixed on the tubular body 231 (i.e., inside the groove 240). The material of the elastic member 510 is, for example, metal or plastic. Thus, when the buckle 540 of the fastener 500 inserts into the fastening recess 150 of the first connection portion 120, the buckle 540 inserts into the through hole 153.

It is noted, when the waveguide 220 inserts into the slot 131, and the buckle 540 is moved into the through hole 153 of the fastening recess 150, the buckle 540 disposed on the free end 523 of the elastic member 510 is pushed into the through hole 153 of the fastening recess 150 by the elastic member 510 due to the elastic force of the elastic member 510.

The unlocking assembly 600 includes a fixed base 610 and a movable pin 620. The fixed base 610 includes a base body 611 and a through passage 612. The base body 611 is fixed within the fastening recess 150. The through passage 612 runs through the base body 611 be and is in communication with the slot 131 through the through hole 153. For example, the longitudinal direction (e.g., the direction X) of the through passage 612 is parallel to the longitudinal direction (e.g., the direction X) of the fastening recess 150. The movable pin 620 is reciprocally located in the through passage 612 for pushing the buckle 540 out of the fastening recess 150.

Specifically, the fixed base 610 includes a barrier portion 613. The barrier portion 613 is protrudingly formed in the through passage 612 and located opposite to the bottom portion 152 of the indentation hole 151. The movable pin 620 includes a shaft 621 and a flange portion 622. The shaft 621 is reciprocally located in the through passage 612. More specifically, one end of the shaft 621 inserts into the slot 131 through the through hole 153, and the other end of the shaft 621 inserts out of the first connection portion 120 through the through passage 612. The flange portion 622 is fixedly disposed on the shaft 621. The width 622W of the flange portion 622 is greater than the width 621W of the shaft 621, so that the movable pin 620 is restricted to be movable between the barrier portion 613 and the bottom portion 152 of the indentation hole 151. Thus, the movable pin 620 will not be disengaged from the fastening recess 150 unexpectedly. In the present embodiment, the fixed base 610 is, for example, a nut, which is screwed in the indentation hole 151 of the fastening recess 150, and the fixed base 610 is coaxially connected to the through hole 153 of the fastening recess 150.

Figure 4A:
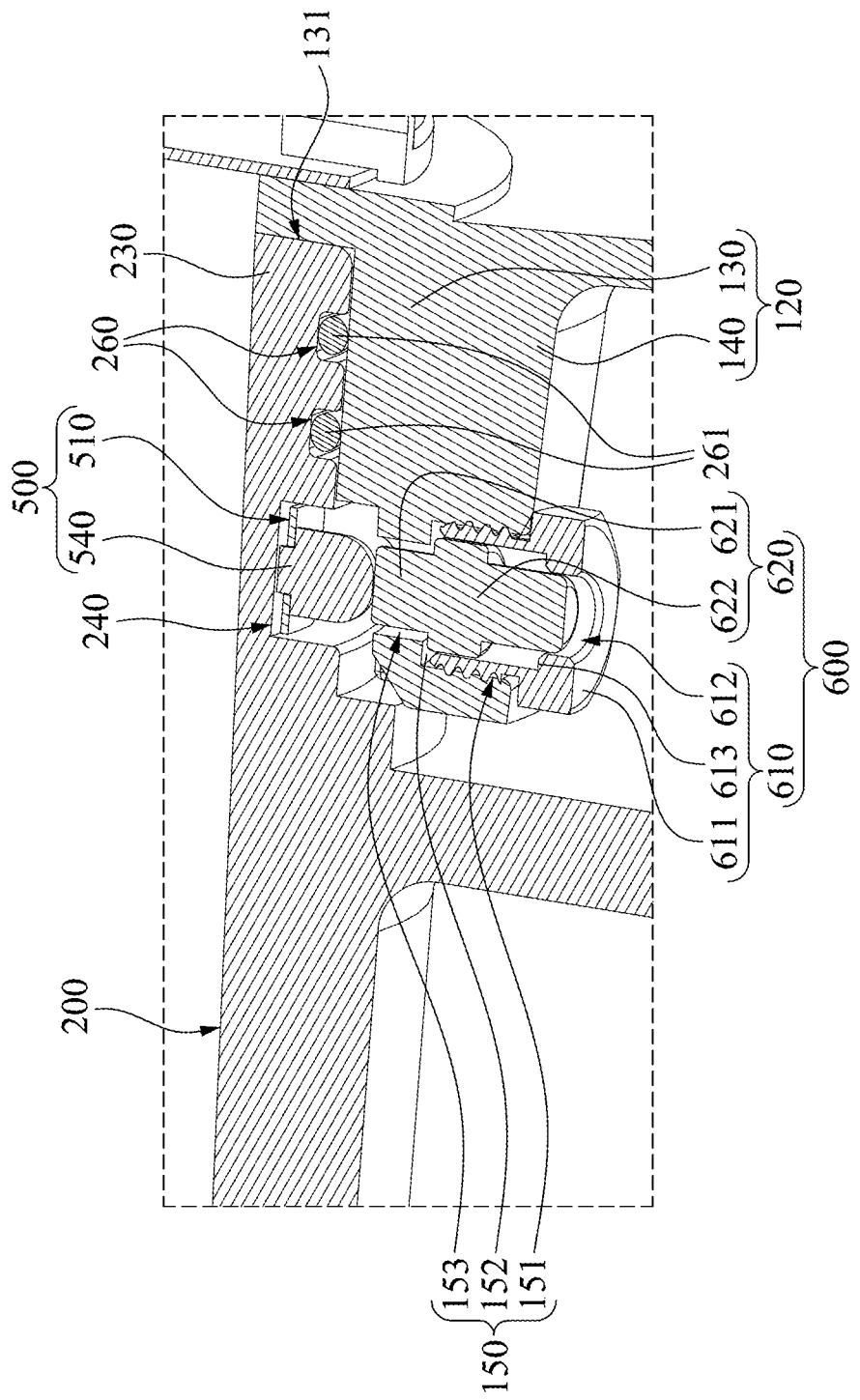
FIG. 4A and FIG. 4B are partial operation views of a fastener and an unlocking assembly of FIG. 3A.
Figure 4B:
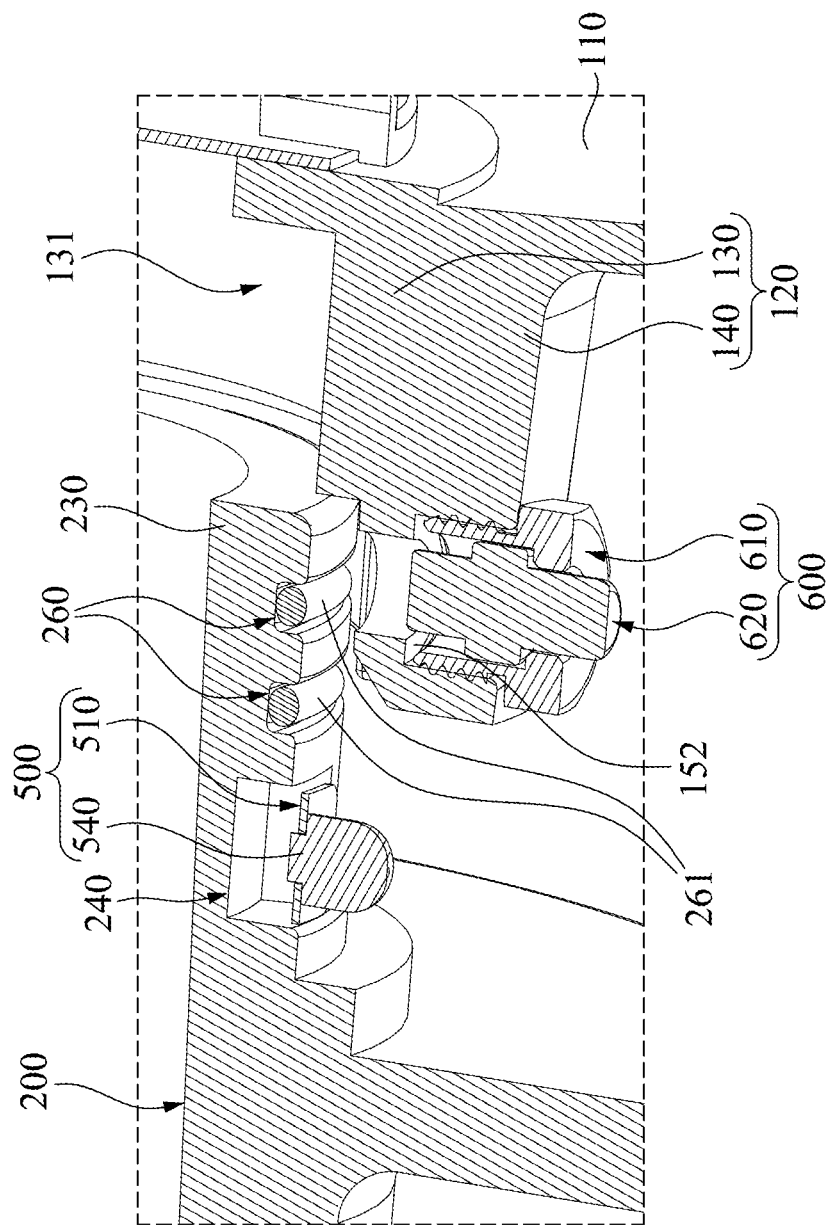

FIG. 4A and FIG. 4B are partial operation views of a fastener 500 and an unlocking assembly 600 of FIG. 3A. As shown in FIG. 2 and FIG. 4A, when a user is desired to detach the first connection portion 120 from the second connection portion 230, the user presses the movable pin 620 at first so that the buckle 540 is pushed out of the fastening recess 150 and into the groove 240 through the through hole 153 by the movable pin 620. At this moment, when the shaft 621 of the movable pin 620 pushes the buckle 540 in the through hole 153, the flange portion 622 of the movable pin 620 can be blocked by the bottom portion 152 of the indentation hole 151, so that the bottom portion 152 of the indentation hole 151 restricts the movement of the movable pin 620.

Conversely, as shown in FIG. 2 and FIG. 3B, when the second connection portion 230 inserts into the slot 131, and the buckle 540 is pushed into the through hole 153 by the elastic member 510, the buckle 540 of the fastener 500 pushes the shaft 621 of the movable pin 620 into the fastening recess 150. When the buckle 540 of the fastener 500 pushes the shaft 621 in the fastening recess 150, because the barrier portion 613 stops the flange portion 622, the movement of the movable pin 620 is restricted by the fixed base 610.

Furthermore, the first connection portion 120 is provided with a first positioning portion 160, and the second connection portion 230 is provided with a second positioning portion 250. The shape of the second positioning portion 250 and the shape of the first positioning portion 160 are complementary to each other. However, the second positioning portion and the first positioning portion are not limited to be complementary to each other. For example, the first positioning portion 160 is a concave arc portion 161 and the second positioning portion 250 is a convex arc portion 251. The pattern of the convex arc portion 251 and the pattern of the concave arc portion 161 are complementary to each other.

Thus, when the second connection portion 230 inserts into the slot 131 of the first connection portion 120 and the second positioning portion 250 is engaged with the first positioning portion 160, the buckle 540 can be coaxially aligned with the other end of the fastening recess 150 exactly. Therefore, the buckle 540 can be inserted into the fastening recess 150 exactly.

Also, as shown in FIG. 2, the waveguide 220 includes one or more (e.g., two) trenches 260 and one or more (e.g., two) elastic rings 261. These trenches 260 are formed on the outer surface of the second connection portion 230 (i.e., the outer surface 233 of the tubular body 231), and these trenches 260 are spaced arranged. Each of the elastic rings 261 is located in one of the trenches 260 to tightly sleeve on the second connection portion 230. The material of the elastic ring 261 is, for example, rubber, plastic, or other waterproof material, and the trench 260 is in, for example, a ring or an arc shape. However, the present disclosure is not limited thereto.

Thus, when the second connection portion 230 inserts into the slot 131 of the first connection portion 120 (FIG. 4A), because each of the elastic rings 261 is squeezed between the second connection portion 230 and the post 130, the elastic ring 261 is tightly abutted between the second connection portion 230 and the inner surface of the slot 131, thereby reducing the possibility of water vapor entering the casing 110 through the slot 131.

Figure 5:
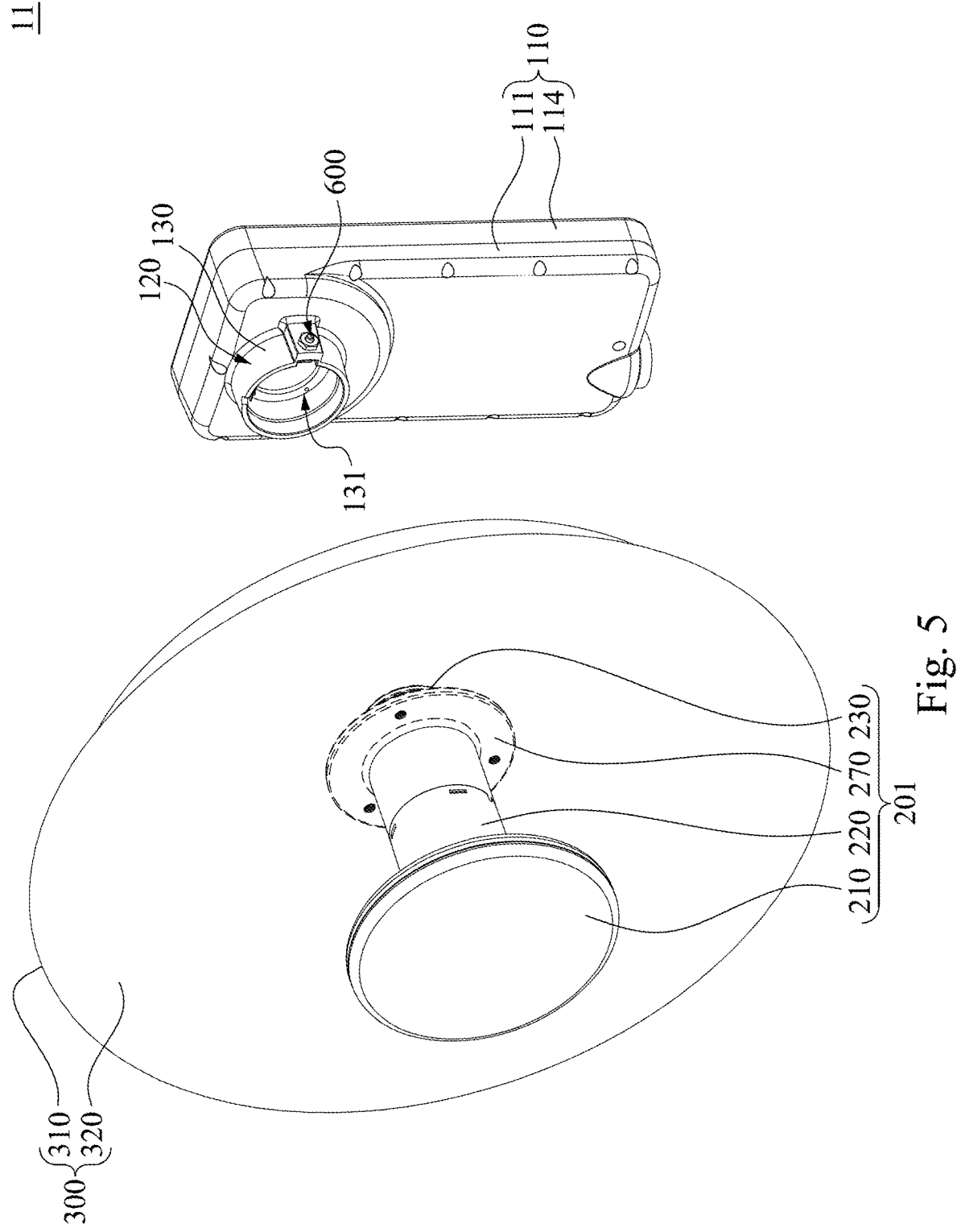
FIG. 5 is an exploded view of the wireless access point device of FIG. 1 according to one embodiment of present disclosure.

FIG. 5 is an exploded view of the wireless access point device 11 of FIG. 1 according to one embodiment of present disclosure. As shown in FIG. 5, the wireless access point device 11 of the present embodiment is substantially the same to the wireless access point device 10 of the aforementioned embodiment. However, at least one difference of the wireless access point device 11 of the present embodiment from the wireless access point device 10 is that the antenna module 201 further includes a dish-shaped reflecting unit 300 which is fixed on the installation seat 270 of the waveguide 220. The installation seat 270 is disposed on the outer edge of the waveguide 220 to surround the waveguide 220. The dish-shaped reflecting unit 300 includes a dish body 310 and a parabolic concave surface 320. The dish body 310 is fixedly disposed on the installation seat 270 and surrounds the waveguide 220. The parabolic concave surface 320 is formed on one surface of the dish body 310 facing away from the casing 110 for reflecting the receiving or transmitting signals of the antenna module 201.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A wireless access point device, comprising:
   a main frame which comprises a casing having an internal space and a first connection portion formed with a fastening recess, wherein the first connection portion is connected to the casing and communicates with the internal space;
   a transmission assembly disposed in the internal space and provided with a signal transceiving element;
   an antenna module comprising a waveguide and a second connection portion disposed on one end of the waveguide, wherein the second connection portion is detachably connected to the first connection portion to couple to the signal transceiving element;
   an unlocking assembly movably disposed in the fastening recess; and
   a fastener comprising a buckle and an elastic member respectively connected to the buckle and the second connection portion of the waveguide,
   wherein the antenna module is fixed on the main frame when the buckle is inserted into the fastening recess; and
   the second connection portion is separable from the first connection portion when the buckle is pushed out of the fastening recess by the unlocking assembly.

2. The wireless access point device of claim 1, wherein the first connection portion comprises:
   a slot communicated with the internal space and the fastening recess and configured to accommodate the second connection portion,
   wherein a longitudinal direction of the slot intersects a longitudinal direction of the fastening recess.

3. The wireless access point device of claim 2, wherein the first connection portion comprises:
   a post protrudingly formed on an outer surface of the casing,
   wherein the slot is formed on one end of the post facing away from the casing, and the longitudinal direction of the slot is parallel to a longitudinal direction of the post.

4. The wireless access point device of claim 3, wherein the fastening recess comprises:
   an indentation hole formed at one side of the post; and
   a through hole formed on one bottom portion of the indentation hole and configured for receiving the buckle,
   wherein the indentation hole is communicated with the slot through the through hole, and
   when the unlocking assembly pushes the buckle out of the fastening recess via the through hole, the second connection portion is separable from the first connection portion.

5. The wireless access point device of claim 4, wherein the unlocking assembly comprises:
   a fixed base comprising a base body and a through passage penetrating through the base body to connect to the slot; and
   a movable pin reciprocally located in the through passage for pushing the buckle out of the fastening recess,
   wherein the movable pin is restricted to be movable in the fastening recess by the base body.

6. The wireless access point device of claim 5, wherein the fixed base comprises:
   a barrier portion protrudingly formed in the through passage and located opposite to the bottom portion of the indentation hole; and
   the movable pin comprises a shaft reciprocally located in the through passage, and a flange portion fixedly disposed on the shaft and restricted to be movable between the barrier portion and the bottom portion of the indentation hole.

7. The wireless access point device of claim 2, wherein the second connection portion comprises:
   a tubular body comprising a hollow channel, an inner surface and an outer surface, wherein the hollow channel is coaxially located in the tubular body, and the inner surface and the outer surface are opposed to each other and located in the hollow channel; and
   a groove formed on the outer surface of the tubular body, wherein when the second connection portion inserts into the slot, the groove is located within the slot.

8. The wireless access point device of claim 7, wherein the elastic member is disposed within the groove, and the elastic member is provided with a free end and a fixed end fixedly connected to the tubular body of the second connection portion, and the buckle is fixedly disposed on the free end of the elastic member,
   wherein when the second connection portion inserts into the slot, the buckle is oriented to moving into the fastening recess.

9. The wireless access point device of claim 1, wherein the first connection portion is provided with a first positioning portion, and the second connection portion is provided with a second positioning portion,
   wherein when the second positioning portion is engaged with the first positioning portion, the buckle is able to insert into the fastening recess.

10. The wireless access point device of claim 1, wherein the antenna module comprises:
    an installation seat formed on the waveguide; and
    a dish-shaped reflecting unit comprising a dish body and a parabolic concave surface, wherein the dish body is fixedly disposed on the installation seat and surrounds the waveguide, and the parabolic concave surface is formed on one surface of the dish body facing away from the casing.

11. The wireless access point device of claim 2, wherein the transmission assembly further comprises a reflective cover disposed within the internal space and fixedly arranged on the signal transceiving element.

12. A wireless access point device, comprising:
    a main frame comprising a casing having an internal space, a fastening recess and a slot communicated with the internal space and the fastening recess;
    a transmission assembly disposed in the internal space and provided with a signal transceiving element;
    an antenna module comprising a waveguide, wherein one end of the waveguide is detachably located in the slot to be coupled to the signal transceiving element;
    an unlocking assembly movably disposed on one end of the fastening recess;
    an elastic member having a free end and a fixed end, wherein the fixed end is opposite to the free end and fixedly connected to the end of the waveguide; and
    a buckle disposed on the free end of the elastic member, when the elastic member is located within the slot, the buckle is moved into the fastening recess for fixing the antenna module on the main frame.

13. The wireless access point device of claim 12, wherein the main frame comprises:
    a post protrudingly formed on an outer surface of the casing,
    wherein the slot is formed on one end of the post facing away from the casing, and a longitudinal direction of the slot intersects a longitudinal direction of the post.

14. The wireless access point device of claim 13, wherein the fastening recess comprises:
- an indentation hole formed at one side of the post; and
- a through hole formed on one bottom portion of the indentation hole and connected to the indentation hole and the slot for receiving the buckle, a hole diameter of the through hole is smaller than a hole diameter of the indentation hole,
- wherein when the unlocking assembly pushes the buckle out of the fastening recess via the through hole, the waveguide is separable from the slot.

15. The wireless access point device of claim 12, wherein the unlocking assembly comprises:
- a fixed base comprising a base body, and a through passage penetrating through the base body to connect to the slot; and
- a movable pin reciprocally located in the through passage for pushing the buckle out of the fastening recess,
- wherein the movable pin is restricted to be movable in the fastening recess by the base body.

16. The wireless access point device of claim 14, wherein the waveguide is formed with a groove, and the groove is formed on the outer surface of the waveguide.

17. A wireless access point device, comprising:
- a main frame comprising:
  - a front cover formed with an opening, an outer surface and an inner surface, and the opening penetrating through the outer surface and the inner surface;
  - a rear cover assembled to the front cover to collectively define an internal space therebetween;
  - a post protrudingly formed on an outer surface of the casing;
  - a fastening recess having a longitudinal direction; and
  - a slot disposed on the post and communicated with the internal space through the opening, wherein a longitudinal direction of the slot intersects the longitudinal direction of the fastening recess;
- a signal transceiving element disposed within the internal space;
- a reflective cover disposed within the internal space and fixed on the signal transceiving element;
- an antenna module comprising a waveguide, wherein one end of the waveguide is detachably located in the slot to be coupled to the signal transceiving element;
- an unlocking assembly movably disposed on the fastening recess; and
- a fastener comprising a buckle and an elastic member, wherein one end of the elastic member is connected to the waveguide, and the other end of the elastic member is fixed on the buckle, the buckle inserts into the fastening recess for fixing the antenna module on the main frame.

18. The wireless access point device of claim 17, wherein the fastening recess comprises:
- an indentation hole formed at one side of the post; and
- a through hole formed on one bottom portion of the indentation hole and connected to the indentation hole and the slot for receiving the buckle,
- wherein when the unlocking assembly pushes the buckle out of the fastening recess via the through hole, the waveguide is separable from the slot.

19. The wireless access point device of claim 17, wherein the unlocking assembly comprises:
- a fixed base comprising a base body, and a through passage penetrating through the base body to connect to the slot; and
- a movable pin reciprocally located in the through passage for pushing the buckle out of the fastening recess,
- wherein the movable pin is restricted to be movable in the fastening recess by the base body.

20. The wireless access point device of claim 17, wherein the waveguide is formed with a groove formed on the outer surface of the waveguide and located within the slot, and
- the elastic member is located within the slot and is provided with a free end and a fixed end fixedly connected to the end of the waveguide, wherein the buckle is coupled to the free end of the elastic member and pushed into the fastening recess by the elastic member.

* * * * *